US006804514B2

(12) United States Patent
Wiedeman et al.

(10) Patent No.: US 6,804,514 B2
(45) Date of Patent: Oct. 12, 2004

(54) GLOBAL DUAL TERMINAL LOW EARTH ORBIT COMMUNICATIONS SYSTEM

(75) Inventors: Robert A. Wiedeman, Sedalia, CO (US); Paul A. Monte, San Jose, CA (US)

(73) Assignee: Globalstar L.P., San Jose, CA (US)

(*) Notice: Subject to any disclaimer, the term of this patent is extended or adjusted under 35 U.S.C. 154(b) by 520 days.

(21) Appl. No.: 09/811,910

(22) Filed: Mar. 19, 2001

(65) Prior Publication Data

US 2002/0132619 A1 Sep. 19, 2002

(51) Int. Cl.[7] .......................... H04Q 7/20; H04B 7/185

(52) U.S. Cl. ...................... 455/427; 455/12.1; 370/316

(58) Field of Search ............................. 455/12.1, 13.1, 455/13.3, 11.1, 445, 427, 3.05, 3.06; 370/310, 315, 316, 464

(56) References Cited

U.S. PATENT DOCUMENTS

| | | | | |
|---|---|---|---|---|
| 5,960,364 A | * | 9/1999 | Dent | 455/552.1 |
| 6,023,606 A | * | 2/2000 | Monte et al. | 455/13.1 |
| 6,233,451 B1 | * | 5/2001 | Noerpel et al. | 455/427 |
| 6,278,883 B1 | * | 8/2001 | Choi | 455/552.1 |
| 6,529,706 B1 | * | 3/2003 | Mitchell | 455/12.1 |
| 6,622,007 B2 | * | 9/2003 | Linden | 455/12.1 |

\* cited by examiner

Primary Examiner—Nick Corsaro
Assistant Examiner—Edan Orgad
(74) Attorney, Agent, or Firm—Karambelas & Associates (57) ABSTRACT

A satellite-based communications system and a method for operating a satellite-based communications system is disclosed. The system is of a type where communications between a user terminal and a gateway occur using an uplink band of frequencies between the user terminal to at least one satellite and in a downlink band of frequencies between the at least one satellite and the user terminal. The system includes first transceivers in the user terminal, referred to herein as a dual user terminal or dual terminal (10), for transmitting and receiving voice and data in the first and second bands of frequencies using a maximum data rate (e.g., a conventional MSS maximum data rate of 9600 Baud); and further includes second transceivers in the user terminal for transmitting and receiving data in the first and second bands of frequencies using a second data rate that exceeds the maximum data rate. The gateway is a dual gateway (20) that includes a first interface to voice and data signals and circuitry for transmitting and receiving the voice and data signals using the maximum data rate, and further includes a second interface to data signals and circuitry for transmitting and receiving the data signals using the data rate that exceeds the maximum data rate. The first and second interfaces and circuitry, and the first and second transceivers, may operate simultaneously. User terminal registration and control signals are transmitted and received using the first transceiver, for example, using the conventional MSS data rates and signaling protocols. The user terminal may include at least one pointable antenna, and in this case information used for pointing the at least one antenna is received from the gateway using the first transceiver, for example, using the conventional MSS data rates and signaling protocols. The first transceiver is a portion of a Mobile Satellite Service (MSS) terminal that is detachable from the user terminal for being operated as a stand-alone unit for transmitting and receiving voice and data signals in the first and second bands of frequencies using the maximum data rate.

23 Claims, 9 Drawing Sheets

GLOBAL DUAL TERMINAL LOW EARTH ORBIT COMMUNICATIONS SYSTEM

FIELD OF THE INVENTION

This invention relates generally to satellite-based communication systems and, in particular, relates to methods and apparatus for delivering both low speed and high speed data services through a non-geosynchronous orbit (e.g., a low earth orbit) satellite communications system.

BACKGROUND OF THE INVENTION

Conventional communications systems utilize terrestrial and satellite delivery systems to provide various messages, file transfers, video and other high speed media to and from user terminals. These messages may include the delivery of residential/commercial Internet access, distance learning, corporate training, and various broadcast applications. In addition, remote surveillance, remote database retrieval, satellite news gathering and disaster database recovery, and video conferencing. These systems are generally local in nature, or at most are national systems.

The introduction of Mobile Satellite Systems (MSS) allows both voice and low speed data delivery, however, these requirements of the above-mentioned higher speed data services have not yet been adequately addressed by conventional MSS. For example, low earth orbit (LEO) satellite systems such as Iridium™ and Globalstar™ are configured for voice and data up to 9.6 Kbps. While various means of concatenating multiple circuits of these voice circuits are available, such techniques can be difficult to introduce and manage.

OBJECTS AND ADVANTAGES OF THE INVENTION

It is a first object and advantage of this invention to provide an improved satellite-based communication system that overcomes the foregoing and other problems.

It is a further object and advantage of this invention to provide a method and system for delivering high speed data through a low earth orbit satellite system using a multi-terminal and a multi-gateway design.

SUMMARY OF THE INVENTION

The foregoing and other problems are overcome and the foregoing objects and advantages are realized by methods and apparatus in accordance with embodiments of this invention.

A mobile satellite system in accordance with these teachings delivers services between a user terminal and a gateway by employing a plurality of user terminals that cooperate with one another. These teachings, in addition to providing high speed radio frequency (RF) uplinks and downlink, enables a user to roam between regions using transportable and mobile terminals.

In accordance with these teachings there is provided a satellite-based communications system and a method for operating a satellite-based communications system. The system is of a type where communications between a user terminal and a gateway occur using an uplink band of frequencies between the user terminal to at least one satellite and in a downlink band of frequencies between the at least one satellite and the user terminal. The satellite-based communications system includes a first transceiver at the user terminal, referred to herein as a dual user terminal or dual terminal, for transmitting and receiving voice and data in the first and second bands of frequencies using a maximum data rate (e.g., a conventional MSS maximum data rate of 9600 Baud); and further includes a second transceiver at the user terminal for transmitting and receiving data in the first and second bands of frequencies using a second data rate that exceeds the maximum data rate. The uplink band of frequencies may include the L-band, and the downlink band of frequencies may include the S-band. A feederlink operates between the gateway and the at least one satellite, where the feederlink operates in a third band of frequencies, such as the C-band.

The gateway is a dual gateway that includes a first interface to voice and data signals and circuitry for transmitting and receiving the voice and data signals using the maximum data rate, and further includes a second interface to data signals and circuitry for transmitting and receiving the data signals using the data rate that exceeds the maximum data rate. The first and second interfaces and circuitry, and the first and second transceivers, may operate simultaneously.

In the preferred embodiment user terminal registration and control signals are transmitted and received using the first transceiver, for example, using the conventional MSS data rates and signaling protocols.

The user terminal may include at least one pointable antenna, and in this case information used for pointing the at least one antenna is received from the gateway using the first transceiver, for example, using the conventional MSS data rates and signaling protocols.

In a preferred, but not limiting, embodiment the first transceiver is a portion of a Mobile Satellite Service (MSS) terminal that is detachable from the user terminal for being operated as a stand-alone unit for transmitting and receiving voice and data signals in the first and second bands of frequencies using the maximum data rate. In this case it is preferred that the second, higher data rate transceiver remain fully operational. In another embodiment the first transceiver could include only a packet data modem, or a packet data modem could be used to replace the MSS terminal upon its detachment from the second terminal, thereby enabling call set-up and tear-down functions to continue. In a further embodiment two of the MSS terminals could be used, such that if one is removed the other, remaining one, can be used for setting up and tearing down calls.

In a preferred embodiment the gateway includes a PSTN or equivalent interface for voice and data signals and circuitry for transmitting and receiving the voice and data signals using the maximum data rate, and further includes an Internet interface for data signals and circuitry for transmitting and receiving the Internet data signals using the data rate that exceeds the maximum data rate.

In a further embodiment the gateway further includes transceivers for transmitting and receiving data with another gateway, via at least one satellite, in at least one of the first and second bands of frequencies.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, in a global mobile satellite system (MSS) user terminals are generally logged into serving gateways. A serving gateway provides services to the user while the user is within range of serving satellites and the serving gateway. The user is generally assigned to a gateway when the user's terminal is powered on. The location of the gateway may be his "home" gateway or another "remote" gateway. A description of this type of user terminal assignment function can be found in, by example, commonly assigned U.S. Pat. No. 5,448,623, by R. A. Wiedeman and P. A. Monte, the disclosure of which is incorporated by reference herein in its entirety.

In general, the user, after logging into a gateway, is known to be attached to a roamed-to gateway by virtue of the user terminal being logged into a "visitor" location register (VLR), which generally has been authenticated by the user terminal's "home" location register (HLR).

Further reference with regard to a suitable Mobile Satellite System that can be used to practice this invention can be had to, by example, U.S. Pat. No. : 5,526,404, "Worldwide Satellite Telephone System and a Network Coordinating Gateway for Allocating Satellite and Terrestrial Resources", by Robert A. Wiedeman and Paul A. Monte; to U.S. Pat. No. : 5,303,286, "Wireless Telephone/Satellite Roaming System", by Robert A. Wiedeman; to U.S. Pat. No.: 5,619, 525, "Closed Loop Power Control for Low Earth Orbit Satellite Communications System, by Robert A. Wiedeman and Michael J. Sites; and to U.S. Pat. No. : 5,896,558 "Interactive Fixed and Mobile Satellite Network", by Robert A. Wiedeman. These U.S. Patents teach various embodiments of satellite communications systems, such as low earth orbit (LEO) satellite systems, that can benefit from the teachings of this invention. The disclosures of these U.S. Patents are incorporated by reference herein in their entireties, in so far as they do not conflict with the teachings of this invention.

Figure 1:
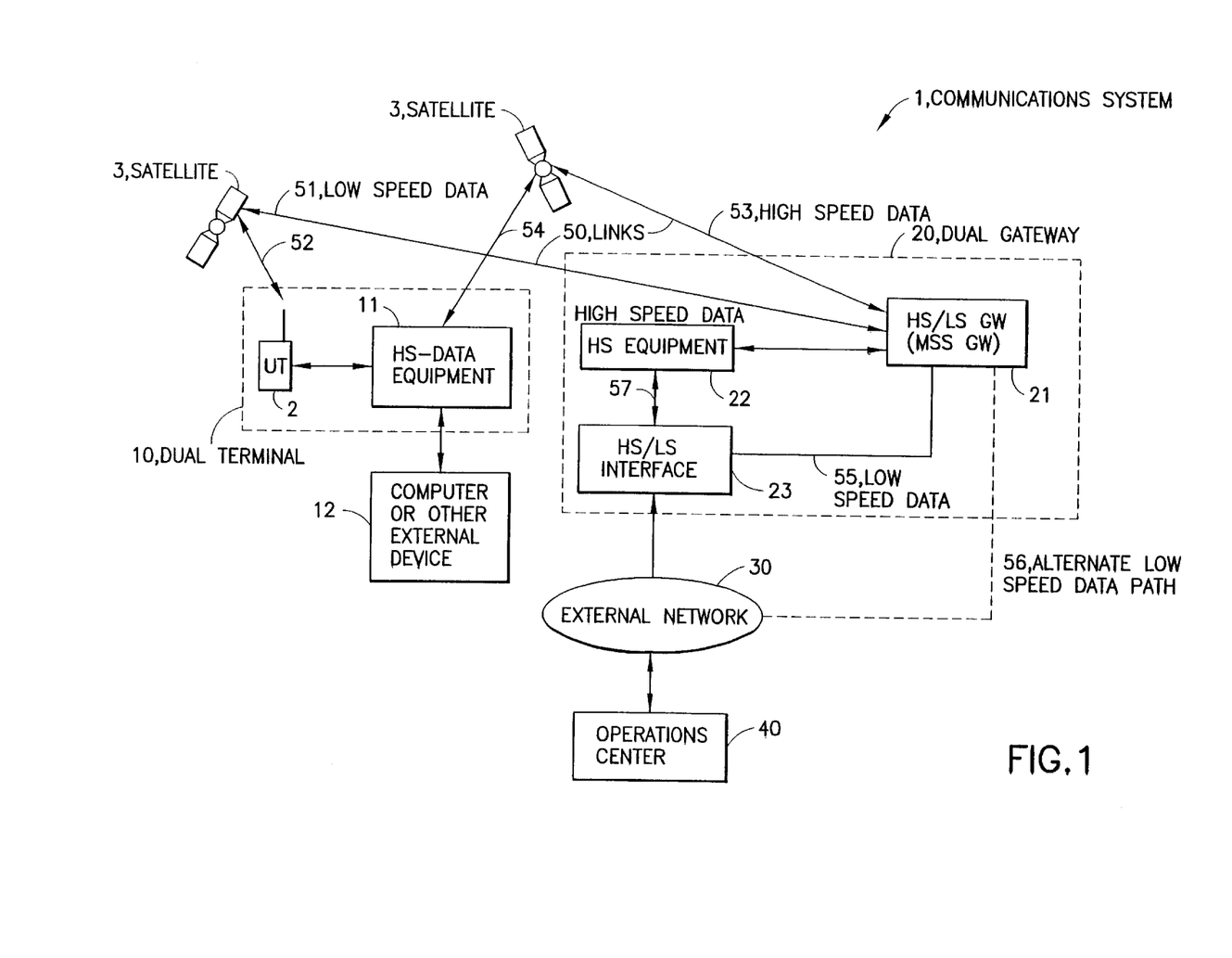
FIG. 1 is a simplified system-level block diagram of the satellite-based low speed/high speed data communications system.

Referring to FIG. 1, the RF signals transmitted from the Dual Terminal 10 and those received by the User Terminal 10 pass through at least one satellite 3, which may be in any suitable altitude and orbital configuration (e.g., circular, elliptical, equatorial, polar, etc.) In the preferred embodiment the satellite 3 is one of a constellation of Low Earth Orbit (LEO) satellites, although one or more Medium Earth Orbit (MEO) satellites could be used. The satellite 3 may be a bent pipe type of repeater satellite, or it may provide on-board signal processing wherein a received transmission is at least partially demodulated to baseband, processed in some way on the satellite, remodulated and then transmitted.

The satellite 3 serves to bidirectionally couple the Dual Terminal 10 to a Dual Gateway 20. A MSS portion of the Dual Gateway 20 includes a suitable RF antenna and transceiver system, such as steerable parabolic antenna, for transmitting and receiving a feederlink with the satellite 3. The feederlink will typically include communication signals for a number of Dual Terminals 10, as well as for conventional MSS-only user terminals. The Dual Gateway 20 also includes banks of modulators, demodulators, voice coders and decoders, as well as other well known types of equipment, which are not shown to simplify the drawing.

In accordance with an aspect of these teachings, and still referring to FIG. 1, the above-mentioned registration functions may be performed by either or both of a High Speed (HS) and a Low Speed (LS) data portion of the Dual User Terminal 10. Low speed data in accordance with these teachings comprises data rates that are typically provided by existing types of MSS, such as a maximum data rate of 9600 baud. High speed data is therefore defined herein to include data rates that exceed the maximum data rate provided by the conventional types of MSS, e.g., high speed data has a data rate that is greater than 9600 baud.

In opposition to a type of system wherein a LEO satellite provides a return link (uplink) and a geosynchronous (GEOS) satellite provides a forward link (downlink), the presently preferred embodiments use a single low earth orbit satellite system to perform both functions. This is an important distinction, as some countries may have satellite access but no ground infrastructure, or not enough traffic to support a typical GEOS satellite system.

There are three basic system assumptions that should be first explained. Note that while a given system can operate within a number of different radio frequency (RF) bands, the following description is based on the use of L-band (uplink) and S-band (downklink) traffic links (between the Dual Terminal 10 and a satellite 3), and C-band feederlinks (gateway 20 to satellite 3 and satellite 3 to gateway 20). The use of these particular frequency bands is not, however, to be construed as a limitation upon the practice of the teachings of this invention. As an example, the feederlinks could as well be Ka or Ku band links, and one or both of the traffic links could be in another frequency band. The three basic assumptions on which embodiments of this invention are based are as follows:

a) an S-Band high speed forward link with S-band receive-only tracking antenna terminal at the Dual Terminal 10;

b) an L-Band high speed return link with L-band transmit-only tracking antenna terminal at the Dual Terminal 10; and c) L/S Band high speed forward and return link with L/S band tracking antenna terminal at the Dual Terminal 10.

Referring now more specifically to FIG. 1, a communications system 1 employs unused spectrum of a MSS system that is providing voice and low speed data services FIG. 1 shows the basic system links. The system 1 includes the Dual (high speed data, low speed data (e.g., MSS)) Terminal 10 and the Dual Gateway 20. The Dual Terminal 10 provides communication access to a user via one or more satellites 3 that are part of a satellite system. The satellite system may include a single satellite or a constellation of two or more satellites, and may be at any orbital altitude including LEO altitudes or medium earth orbit (MEO) altitudes. An existing gateway for MSS services, a Low Speed MSS 21, communicates to a MSS user terminal (UT) 2 which forms a portion of the Dual Terminal 10. Either forward only, return only, or both forward and return links can be used by the UT 2. The Dual Gateway 20 includes not only the MSS low speed (e.g., 9600 baud) gateway 21, but has in addition a set of High Speed Equipment 22. A feature of this system is that the modulation type and receive/transmit functionality of the HS Equipment 22 may be different than that of the low(er) speed links used by the MSS gateway 21. A High Speed and Low Speed (HS/LS) Data Interface 23 handles the data distribution of high speed data 57 and low speed data 55 between the two systems. Through the HS/LS Interface 23 the Dual Gateway 10 may be connected to an external network 30, and possibly also connected to an Operations Center 40, either directly or via the external network 30.

There are various radio frequency (RF) links 50 used by the system 1. A low speed RF link (either forward or return or both) 51 connects the satellite 3 and the Dual Gateway 20. A high speed RF link (either forward or return or both) 53 connects the satellite 3 and the Dual Gateway 20. A low speed RF link (either forward or return or both) 52 connects the satellite 3 and the Dual Terminal 10. A high speed RF link 54 connects the satellite 3 and the Dual Terminal 10. Session setup, terminal control and other operational functions are performed by the UT 2.

The Dual Terminal 10, in addition to the (low speed) UT 2, includes High Speed (HS) Data Equipment 11 that is operable with the High Speed Equipment 22 of the Dual Gateway 20. The Dual Terminal 10 may be connected to an external device 12 such as a computer 12, and may also have other functional devices included. Input/output data to the Dual Terminal 10 is provided by the computer or other external device 12, but may be integrated into the Dual Terminal 10. The Input/output of the Gateway 20 is generally directed through the external network 30 from the Operations Control Center 40, but this function, including terrestrial links, may also be integrated into the Gateway 20.

The HS/LS Interface 23 can be located in the Dual Gateway 20, as shown, or in the Operations Control Center 40. The High Speed data is directed to and received from the HS Equipment 22. This data is received from or sent to an intermediate frequency (IF) section of the MSS gateway 21 and is received from or transmitted to link 53 to the satellite 3, which repeats (retransmits) the signal to the HS-Data Equipment 11 of the Dual Terminal 10 over link 54.

While these teachings are made in the context of the satellite(s) 3 being "bent pipe" repeater satellites, in other embodiments the satellite(s) 3 may be on-board processing satellites, wherein received transmissions are demodulated to baseband for on-board processing, and may include cross-links to other satellites.

In operation, low speed data is directed to and received from the MSS portion 21 of the Dual Gateway 20 over the low speed signal path 55. The low speed signal path 55 may be internal to the Dual Gateway 20, or preferably it can be the Public Switched Telephone Network (PSTN) and/or some other suitable internal or external network that provides an alternate low speed data path 56. High Speed data path 57 routes high speed data to and from the HS-Equipment 22 and thence to the IF section of the MSS GW 21 and to the RF section of the Dual Gateway 20.

The use of the Dual Gateway 20 and the Dual Terminal 10 allows parallel usage of both without interrupting the Mobile Service Operations (MSO). It also permits full use of only a low speed service, such as a removable or detachable voice and low speed MSS terminal (UT 2). The removable feature allows the user to have a dual mode satellite phone operable in both terrestrial and satellite environments in a manner similar to a typical cellular phone. However, when electrically inserted into the Dual Terminal 10 the UT 2 completes the Dual Terminal 10 complement of equipment and enables the user to operate the high speed data system, such as when it is desired to upload data files from and/or to download data files to the computer or other equipment that form the external device(s) 12.

The dual HS/LS communications system 1 enables the use of two different modulation systems, and may have independent billing and control, or centralized billing and control. For example, the MSS forward link can use QPSK modulation, while the MSS return link may use 16 QAM modulation. In this case, one or both of the modulation types for the High Speed system may be different. Further by example, while the MSS links can be CDMA links, the High Speed links could be TDMA links (or vice versa). The system 1 can be configured to provide the Dual Gateway 20 with an S-Band high speed forward link only (FIG. 2), an L-Band high speed return link only (FIG. 3), or an L/S Band high speed forward and return link (FIG. 4). The system 1 preferably uses the low speed (MSS) link as a command/control link and to set-up the system. The system 1 may thus provide a high speed data broadcast function and a low speed data delivery function in parallel. Options include various types of Dual Terminal 10 antennas for mobile, transportable, and fixed installations. The system 1 can support hub and spoke or mesh architectures, or both, at the same time. Furthermore, interactive operation between the HS and the LS data functions is supported by the system 1. For example, a user may be receiving High Speed data from the HS Equipment 11, 22, and interacting with the received content to send low speed data back to the operations control center 40 via UT 2 and MSS GW 21. Alternatively, the user may be sending high speed data, and the operations control center 40 may send information or control signals to the Dual Terminal 10 using the low speed links. An alternative embodiment incorporates setup and control functionality on either the HS or the LS systems to facilitate single system usage. In another embodiment the UT 2 could include or could be replaced by only a packet data modem, or a packet data modem could be used to replace the UT 2 upon its detachment from the Dual Terminal 10, thereby enabling call set-up and tear-down functions to continue. In a further embodiment two of the UTs 2 could be used, such that if one is removed the other, remaining one, can be employed when setting up and tearing down calls.

In another embodiment the first transceiver could include only a packet data modem without voice capability, or a packet data modem could be used to replace the MSS terminal upon its detachment from the second terminal, thereby enabling call set-up and tear-down functions to continue. In a further embodiment two of the MSS terminals could be used, such that if one is removed the other, remaining one, can be used for setting up and tearing down calls.

A description will now be made of a gateway to high speed downlink system, with low speed service.

Figures 2, 2A:
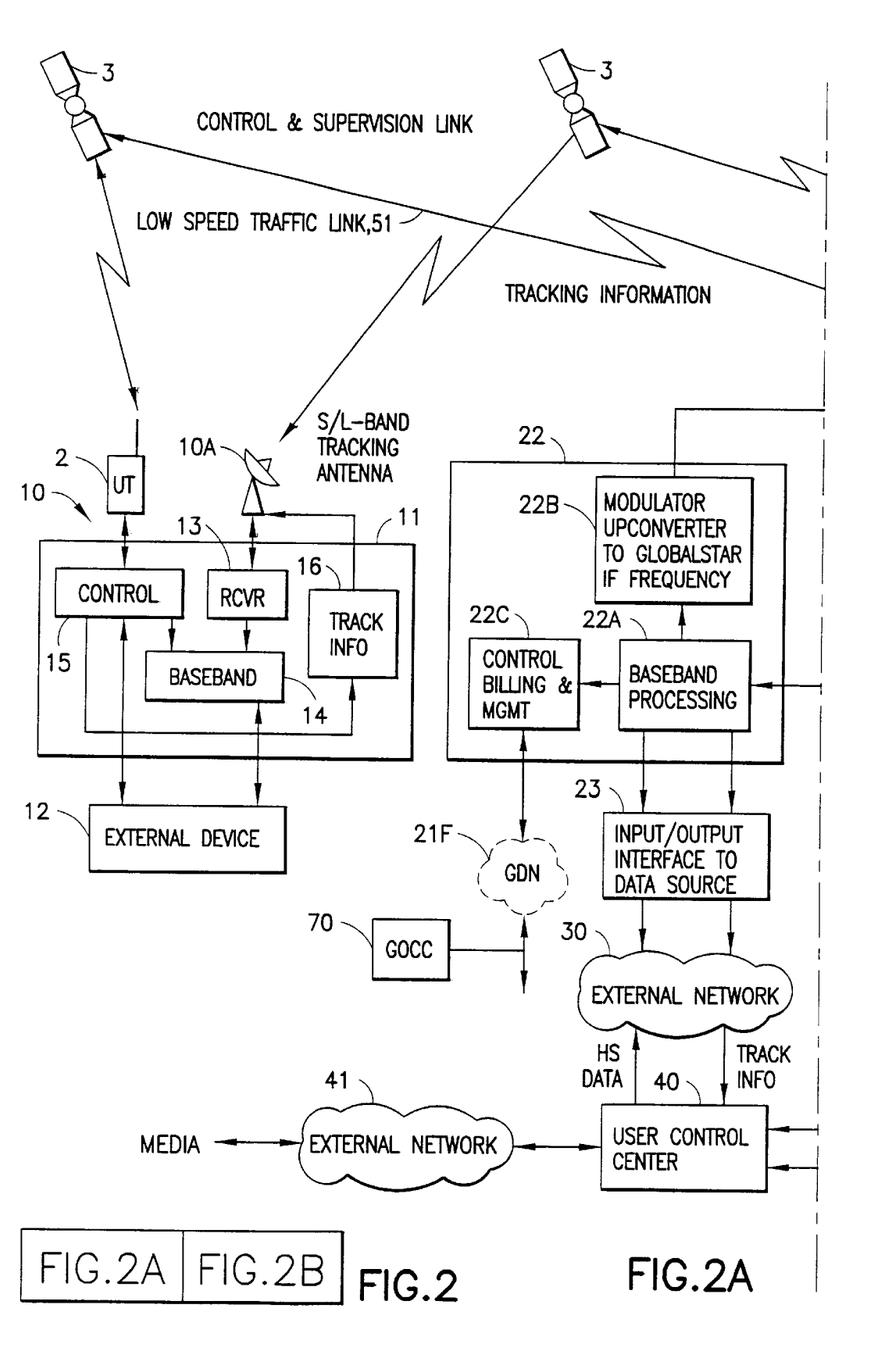
FIG. 2 is a block diagram showing the system of FIG. 1 in greater detail and, more particularly, a gateway to user terminal high speed data downlink system with MSS user terminal control.
Figure 2B:
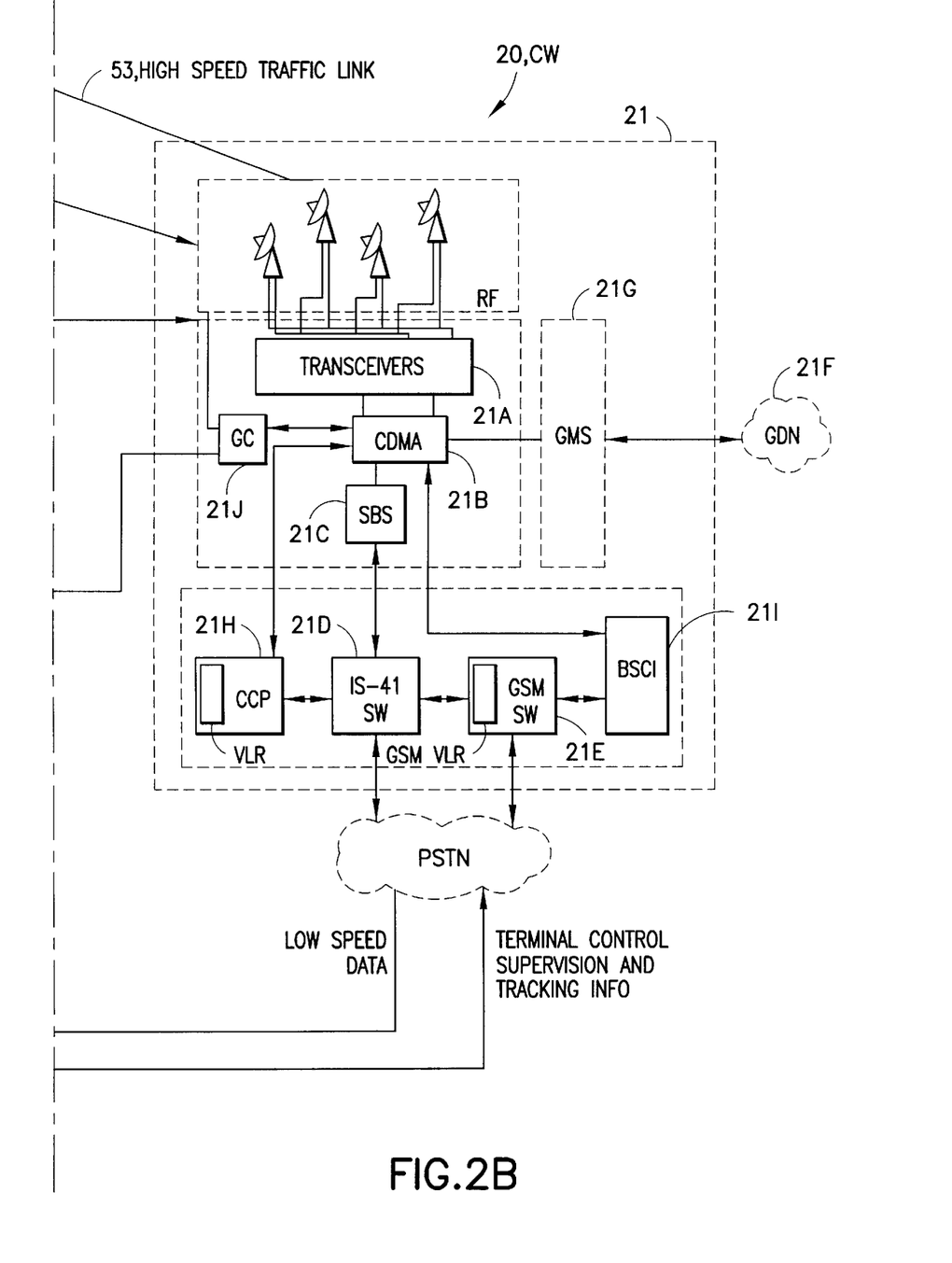

FIG. 2 shows the system 1 arranged for high speed data delivery to the Dual Terminal 10, referred to for convenience as configuration (a). Data flows to and from the Operations or User Control Center 40. High Speed Media such as Internet content, distance learning video, corporate training materials and video, and broadcast applications flow to the Operations Center 40 from an external network 41, such as the Internet or a corporate intranet or extranet. User generated information flows via satellite relay to the MSS Gateway 21 and by an internal network, or by the Internet, or by the PSTN, to the Operations Center 40, and is then sent over terrestrial or other satellite links (which can be the same as in this invention) to provide two way interactive communications with the information or media provider. High speed data is sent from the Operations Center 40 via an internal or external network connection to the HS/LS interface 23. After processing the data is sent to the High Speed Equipment 22 that includes a baseband processor 22A and a modulator/upconverter 22B where the data is processed, modulated and upconverted to an Intermediate Frequency (IF) that matches the IF of the MSS Gateway 21. The HS Equipment 22 sends the data to the IF of the MSS Gateway 21 where it is combined with other data in that data stream. Selection of frequencies allows multiplexing of the signals. The High Speed Data IF is then upconverted to the desired transmit frequency and transmitted by the transmitter 21A of the MSS Gateway 21 toward the satellite 3. The satellite 3 repeats the signal toward the Dual Terminal 10. The Dual Terminal 10 is fitted with at least an omni-directional antenna, but preferably is fitted with at least one, but preferably two, tracking antennas 10A. Alternatively, a selectable multi-beam antenna may be used. The signal is received by the antenna 10A and is routed to a receiver 13 where it is downconverted and demodulated before being sent to a baseband processor 14. The signal, now a data stream, is next sent to external device 12, which could be a display or a PC or any suitable type of equipment for providing the user with the media sent from the Control Center 40. Note that the display or device 12 could be implemented so as to be internal to, or integral with, the UT 10.

A user response to the displayed media, e.g. keyboard input and/or mouse clicks, is typically data at a lower data rate than the high speed data sent to the user. For example, the user types a response on a keypad, or uses voice activation, or provides some other input controls or input data. This data can be provided from the external device 12, or the input may be generated internal to the Dual Terminal 10. The user inputted controls and/or data are routed through the High Speed Equipment 11, or it may be provided directly to the UT 2. In any case the low speed data (e.g., 9600 baud or less) is routed to the UT 2 and is processed, modulated and transmitted according to the requirements of the MSS system.

In a preferred, but not limiting, embodiment the signal is modulated as a Code Division Multiple Access (CDMA) signal that is transmitted toward the satellite 3. The satellite 3 used for receiving the UT signals may be the same satellite as that used for the High Speed downlink signal, or may be any one of the constellation of satellites orbiting in the vicinity of the user and able to communicate to the Gateway 20 that the user is attached to. The signal sent to the satellite 3 is repeated to the Gateway 20 on the RF link used for the MSS system. The signal is received at the MSS Gateway 21 and, after downconverting, demodulating in transceivers 21A and CDMA system 21B, and otherwise being processed, is delivered to a Selector Bank System (SBS) 21C. The signal after processing by the SBS 21C is provided as an output. This output signal may be sent to a Mobile Switching Center (MSC), such as an IS-41 switch 21D or a GSM switch 21E (that contains the GSM VLR), or to a Router, or it may be provided directly to the HS/LS Interface 23 in the High Speed System 22. Depending on the means chosen, the signal is either routed via an internal or external network 30 to the Operations Center 40 (also referred to herein as the User Control Center). The signal is then processed by the Operations Center 40 and, depending on the nature of the call setup desired, is routed to the external network 41 for interaction with the Media provider, or is used otherwise in the Operations Center 40. The Operations Center 40 may be co-located with the Gateway 20, or it may be at a remote location and connected though the external network 30.

Further components of the MSS Gateway 21 a Call Control Processor (CCP) 21H that generally handles radio setup and channel assignments, among other call-related functions. The CCP 21H can include the Gateway VLR. A Base Station Control Interface (BSCI) 211 detects the presence of a GSM call and routes the call to the GSM switch 21E, enabling the possibility of GSM roaming. These various components can be included with or within a signaling system seven (SS-7) server unit. If present, the HLR could be part of the SS-7 server.

Block 21J represents the Gateway Controller (GC) that provides overall control of the Gateway 20, and that provides an interface to and controls the operation of the set of High Speed Equipment 22.

It should be noted that if the media or data flowing towards the user is low speed data, the signal after processing by the Operations Center 40 is sent to the MSS system for delivery via the satellites 3 to the UT 2 in the normal manner of the MSS system. The decision logic or point of which path (LS or HS) to use may be located in the Operations Center 40, or may be located in the HS/LS Interface 23.

The UT 2 can be used for the delivery of tracking and terminal control signals, as well as for low speed (MSS) data delivery and transmission. The MSS system receives supervision and control signals from the Operations Control Center 40 or from any external facility. Alternatively, the UT 2 and the Dual Terminal 10 can be controlled from the HS Data System 22 co-located with the MSS Gateway 21. Commands and other signals are sent via the MSS low speed data system over Control and Supervision Links. In an alternative embodiment the commands and other signals may be sent over the High Speed system. As was mentioned above, a packet data modem could also be used, as could more than one UT 2.

Tracking signals are important when the Dual Terminal 10 is fitted with tracking antennas 10A. A MSS Ground Operations Control Center (GOCC) 70 provides information over a Ground Data Network (GDN) 21F as to which satellite(s) of the constellation to use and for other transmission parameters, such as power at which to transmit, frequencies to use, which RF antenna(s) are to be used, etc. Antenna pointing information is sent to the Operations Center 40, which is preferably also connected to the GDN 21F. The tracking and other information is sent over the Control and Supervision links to the UT 2 and, after processing, to the baseband unit 14 of the Dual Terminal 10. The baseband unit 14 converts the information to control signals used by a Track Information unit 16 to point and track the antenna or antennas 10A of the Dual Terminal 10.

Also located in the High Speed Equipment System 22 of the Dual Gateway 20 a Control and Billing Management system 22C. The Billing and Management system 22C is preferably connected to the GOCC 70 via the GDN 21F, but may instead be connected to the Gateway Management System (GMS) 21G of the MSS Gateway 21. The Billing and Management system 22C accounts for system usage and provides Call Detail Records and other information such that the user can be charged appropriately, and so that the air time used can be correctly charged to the system provider.

System control is exercised so that priorities of transmission are accounted for. For example, High Speed Data may be restricted during certain periods of time in order to allow maximum MSS voice circuit usage during high voice traffic periods. Conversely, more of the MSS bandwidth can be allocated to the High Speed Data Services during periods of lower MSS voice/data traffic demand. In this case the high speed data can be spread over a wider bandwidth, enabling higher data rates. It should be noted that in some embodiments it may not be necessary to share the in-band spectrum between the LS/HS services, as adjacent spectrum may be employed for providing the HS services (and/or for providing the LS services). Gateway provider control can be used for these purposes, or the control may be dictated by the GOCC 70 under the direction of the system operator.

Figures 3, 3A:
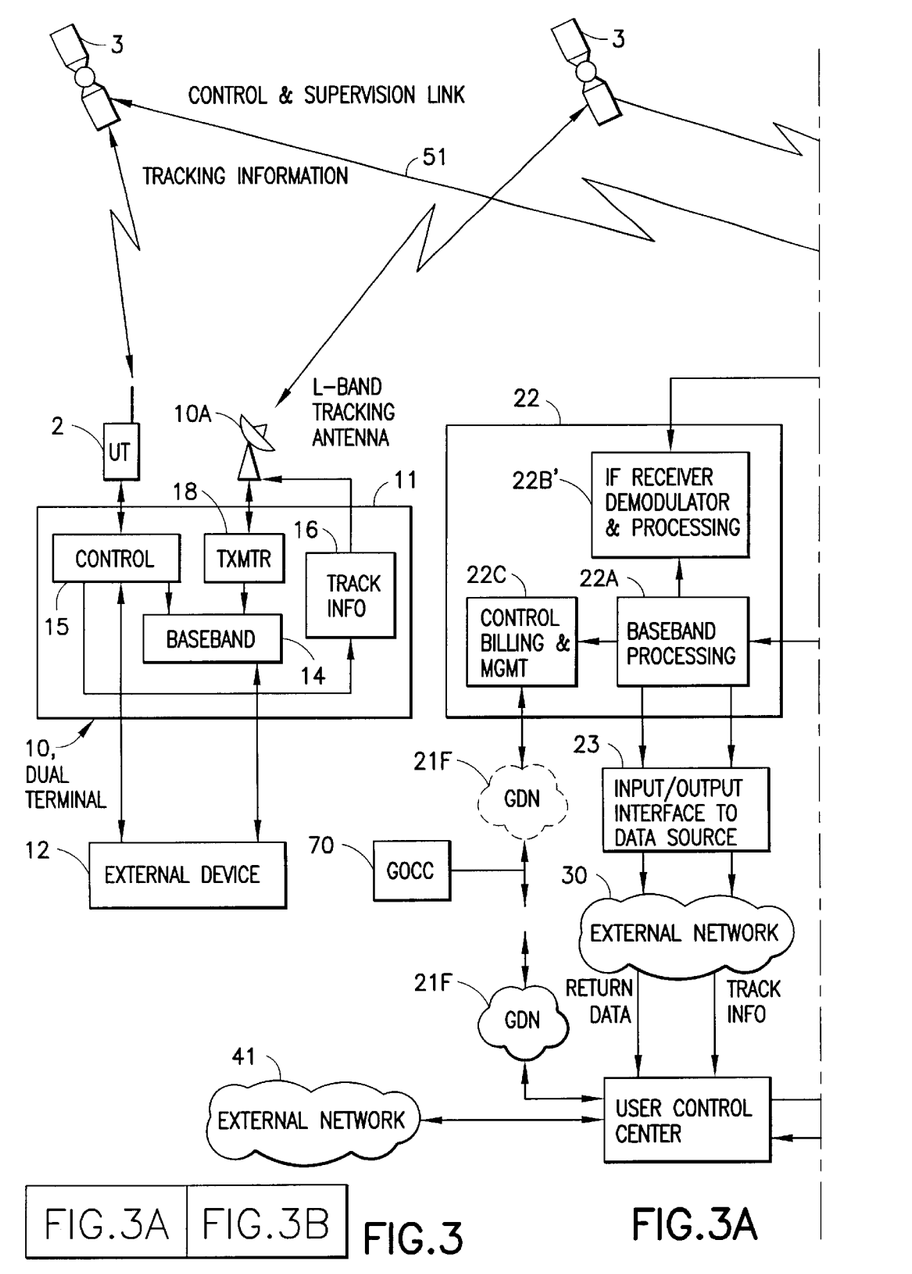
FIG. 3 is a block diagram showing the system of FIG. 1 in greater detail and, more particularly, a user terminal to gateway high speed data uplink system with MSS user terminal control.
Figure 3B:
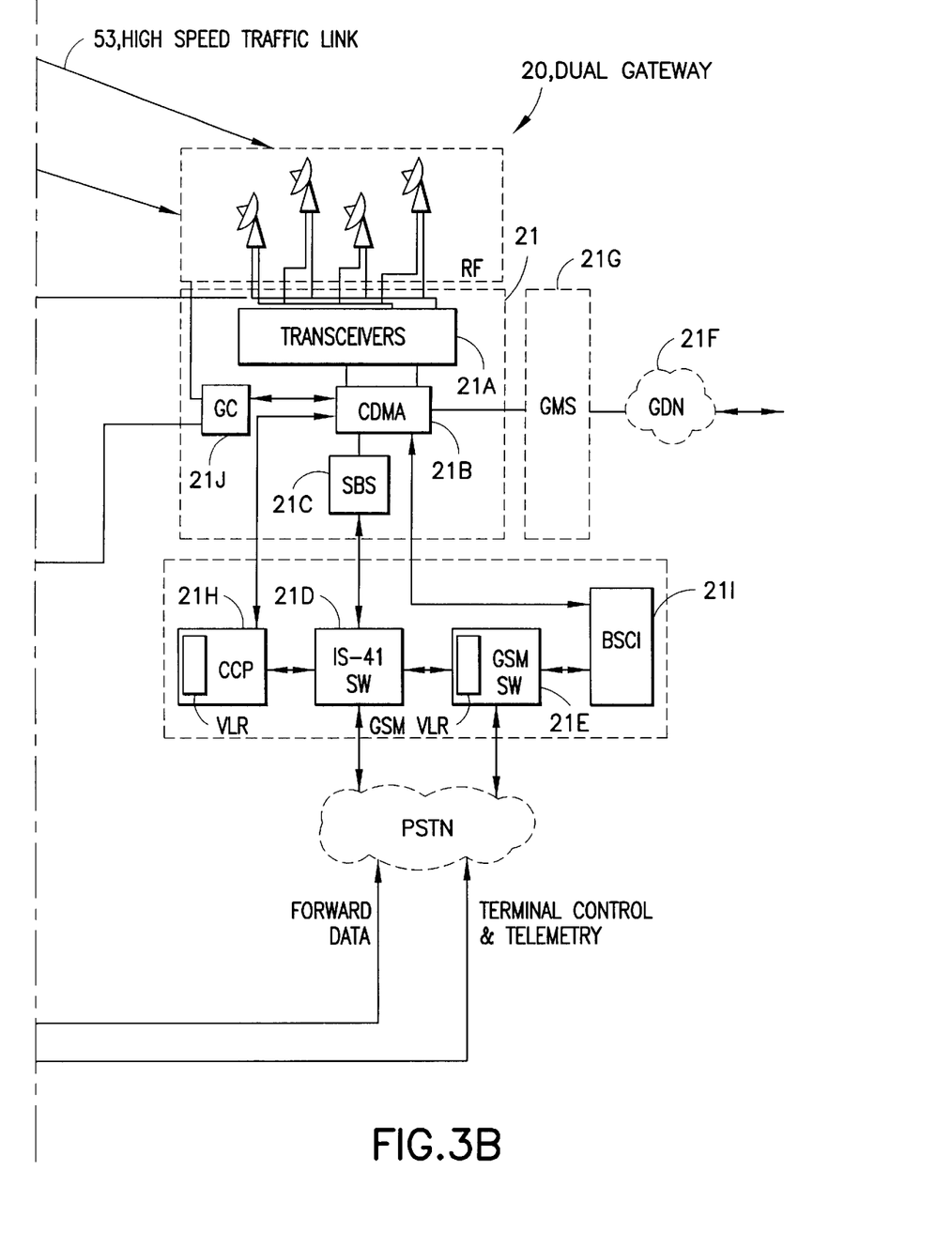
Figures 4, 4A:
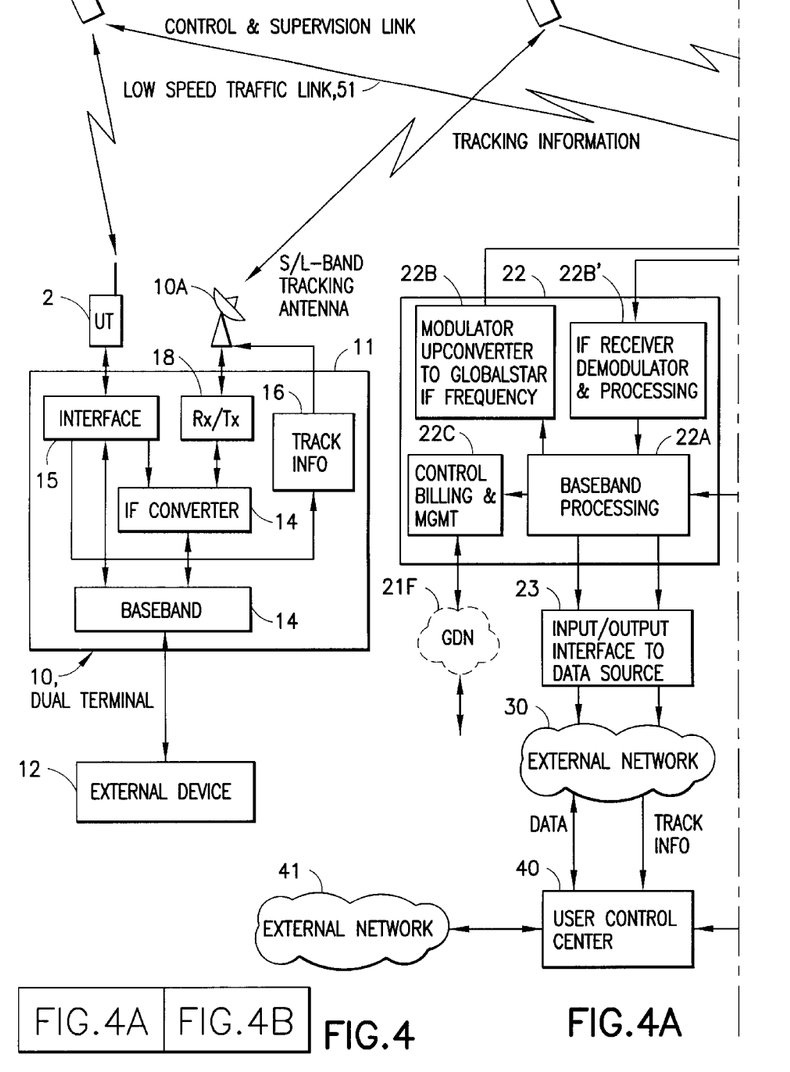
FIG. 4 is a block diagram showing the system of FIG. 1 in greater detail and, more particularly, a two way dual terminal MSS user terminal control.
Figure 4B:
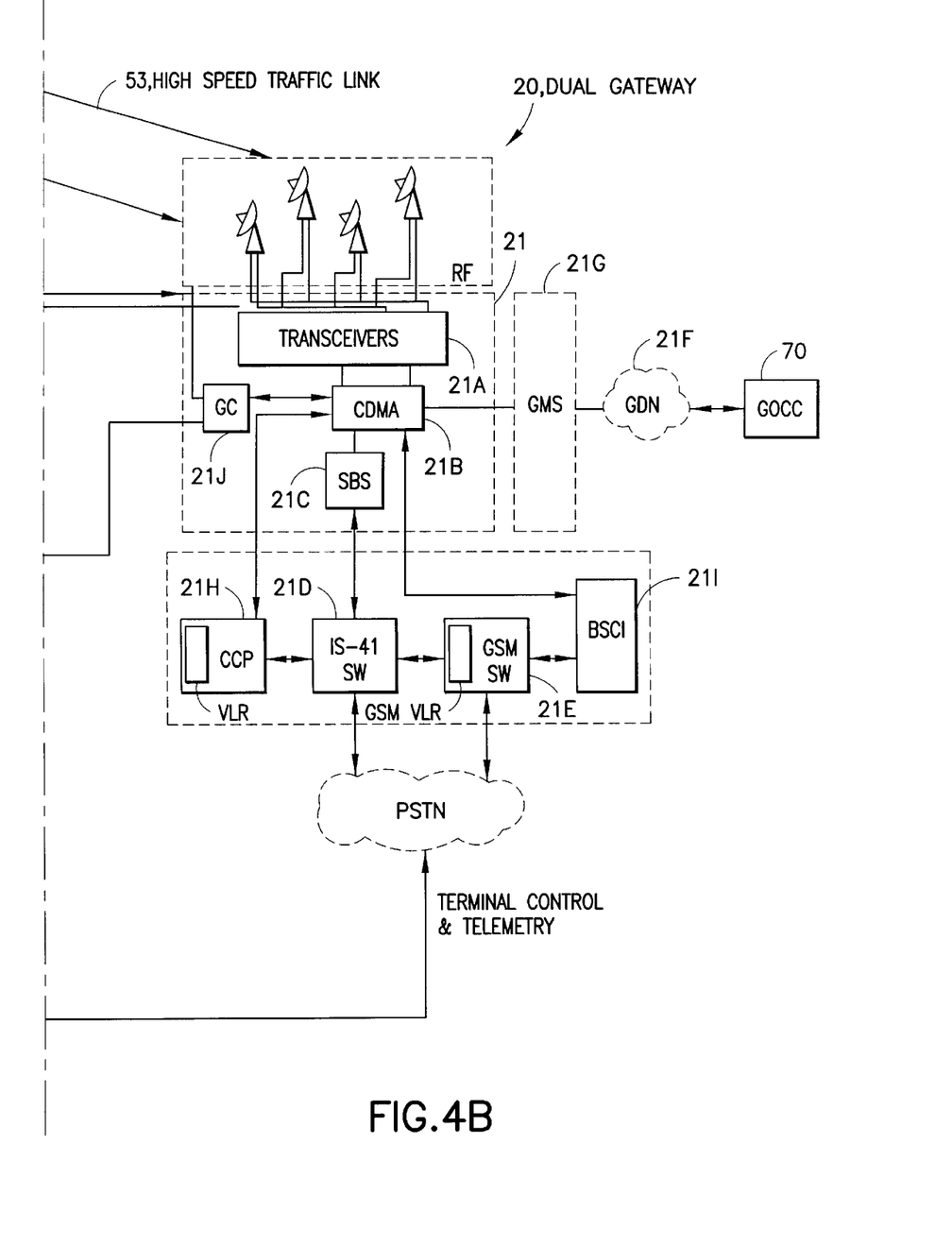

Referring now to FIG. 3, there is shown a case of Dual Terminal 10 to Gateway 20 High Speed Uplink with MSS UT 2 control and Low Speed Service. That is, FIG. 3 shows the equipment arranged for High Speed Data delivery from the Dual Terminal 10, referred to for convenience as configuration (b). In this embodiment Media and High Speed Data flows from the Dual Terminal 10 via a satellite 3 and the High Speed Data Equipment 22 of the Dual Gateway 20 to the Operations Center 40, and thence possibly to some external user-related facility. High Speed Media such as remote surveillance, remote database recovery, satellite news gathering, disaster data recovery, etc., flows to the Operations Center 40 from the Dual Terminal 10. Low Speed Data generated by the external user facility, or from any other source, flows over terrestrial or other satellite links (which can be the same as in this invention) to the MSS Gateway 21, or flows through an internal network or the Internet, and provides two way interactive communications with the Dual Terminal 10 (which may be unmanned or operated by the user.) In this embodiment the modulator/upconverter 22B is replaced with an IF receiver, demodulator and processing block 22B'.

High Speed Data is received at the Operations Center 40 via an internal or external network connection to the HS/LS interface 23. The High Speed Data is typically provided to the Dual Terminal 10 from the external device 12, however it may also be internally generated. After processing, the data is sent to the baseband unit 14 where it is further processed. Software in the external device 12 or, alternatively, in the baseband unit 14 decides by which path to send the data, either through the High Speed Traffic link or via the UT 2 and the low speed data link. If the path chosen is the High Speed link, then the baseband unit 14 routes the signal to the transmitter 18 where it is modulated onto a carrier and upconverted to the transmit frequency and thence applied to the L-band tracking antenna 19. Alternatively, the antenna may be an omni-directional antenna or a phased array, or a switched multi-beam antenna, or a pseudo-omni antenna. The signal is transmitted to one or more satellites 3 where it is repeated to the MSS Gateway 21 RF subsystem on the High Speed Traffic link. The signal is received by the RF subsystem 21A and down-converted to an Intermediate Frequency. The IF signal is applied to the IF receiver demodulator and processing subsystem 22B' of the High Speed Gateway equipment 22. After demodulation and baseband processing in baseband processor 22A the signal is applied to the Output Interface 23 and sent by the external network 30 (or an internal network) to the Operations Center 40.

Data to be sent to the Dual Terminal 10 can be provided from the external network 41, such as via the Internet, or by any other suitable means. The data is routed to the Operations Center (User Control Center) 40 and is sent by the PSTN or by the Internet to a router, or is routed internally within the Dual Gateway 20. In any case the low speed data is routed to the MSS Gateway 21 and is processed, modulated and transmitted according to the requirements of the MSS system. The signal, again preferably modulated as a CDMA signal, is transmitted toward the satellite 3. The satellite 3 used for receiving the UT 10 signals may be the same satellite as that used for the High Speed uplink signal from the UT 10, or it may be any of the constellation of satellites orbiting in the vicinity of the user and able to communicate to the Dual Terminal 10. The signal sent to the satellite 3 is repeated to the Dual Terminal 10 on the Low Speed RF link used for the MSS system. The signal is received at the Dual Terminal 10 and after downconverting, demodulating, and otherwise being processed is delivered to the external device 12, and/or to an internal display, processor or actuator.

The UT 2 may be used for delivery of tracking and terminal control signals, as well as for transmitting and receiving Low Speed Data in parallel with the High Speed Data. The MSS Gateway system 21 receives supervision and control signals from the Operations Control Center 40, or from any other suitable facility. Alternatively, the UT 2 and the Dual Terminal 10 in general can be controlled from the HS Data system 22 that co-located with the MSS Gateway 21 at the Dual Gateway 20.

Commands and other signals are sent via the MSS low speed data system over the Control and Supervision Links to the satellite 3. These tracking signals are important when the Dual Terminal 10 is fitted with one or more of the tracking antennas 10A. The above-mentioned GOCC 70 provides information on which satellite(s) of the constellation to use and other transmission parameters, such as power to transmit, frequencies to use, RF antenna selection, etc. Pointing information is sent to the Operations Center 40 which is connected to the GDN 21F. The tracking and other information is then sent over the Control and Supervision links to the UT 2 and to the baseband unit 14 of the Dual Terminal 10. The baseband unit 10 converts the information to control signals for the Tracking Information unit 16 that is used to point the antenna 10A or antennas of the Dual Terminal 10.

Described now is a Dual Terminal 10 to Gateway 20 High Speed Uplink System with UT 2 control and Low Speed Service.

More specifically, FIG. 4 shows an arrangement of equipment suitable for two way communications of both low and high speed data. This arrangement combines certain of the aspects of the invention as described above in relation to FIGS. 2 and 3 (embodiments (a) and (b)). In this configuration High Speed data is sent to and received from the Gateway High Speed Equipment 22, which contains both of the units 22B and 22B', while the simultaneous sending and receiving of low speed data may also be carried out. One suitable, but not limiting, application of this configuration is for broadcast data distribution, where the return link from the Dual Terminal 10 exceeds the capabilities of the low speed return link provided by the UT 2. Other applications include two way interactive data (e.g., Internet data), point of sale communications to/from retail locations, on-line inventory management and database interaction and upload/download. Also encompassed by this application are DVB transmissions that provide multi-media data transfers at higher rates than a typical MSS system can provide, and DBS transmissions that are converted to MPEG-compliant digital formats.

In these various embodiments of the invention the identification of the Dual Terminal 10 may be accomplished in various ways. The Dual Terminal 10 may one or more of an electronic serial number (ESN), a GMSS telephone number unique to the global system in which the UT 10 operates, a local telephone number, or a terrestrial paging number and ID. The logging-in process utilizes the UT 10 and preferably can emulate the logging-ion process of a terrestrial cellular system. By using the MSS gateway 21 for this purpose it is not necessary to have a complicated Hub Station, as in conventional Ku and C band systems.

One feature of the Dual Terminal 10 is that the MSS UT 2 may be unplugged from a socket in the Dual Terminal 10 and used as a stand alone low speed (e.g., 9600 Baud and below) data and voice terminal. In this case it is preferred that the High Speed portion of the Dual Terminal 10 also remain fully functional, and capable of handling call setup, teardown, and other required functions.

Another feature of the Dual Terminal 10 is the simultaneous High Speed and Low Speed data delivery. By example this allows a High Speed downlink of a video program in addition to two-way interactive low speed data and/or voice. One exemplary application of this feature is a video camera providing details of a medical operation with a two way simultaneous voice conversation between two physicians. Other applications are numerous, such as interactive Satellite News Gathering (SNG). In the satellite news gathering example, the operator of the Dual Terminal 10 can use the UT 2 as a cellular or satellite cellular telephone, then install the UT 2 into the Dual Terminal 10 and begin transmitting video with a sound component, in addition to receiving data and voice from a producer and/or director without interrupting the return link video feed that is in progress. Remote operation of a video camera using the Dual Terminal 10 system is also within the scope of this invention, where camera commands and status are transferred over the lower speed MSS links, while the actual video is transferred over the higher speed traffic link to the Dual Gateway 20.

Figures 5, 5A:
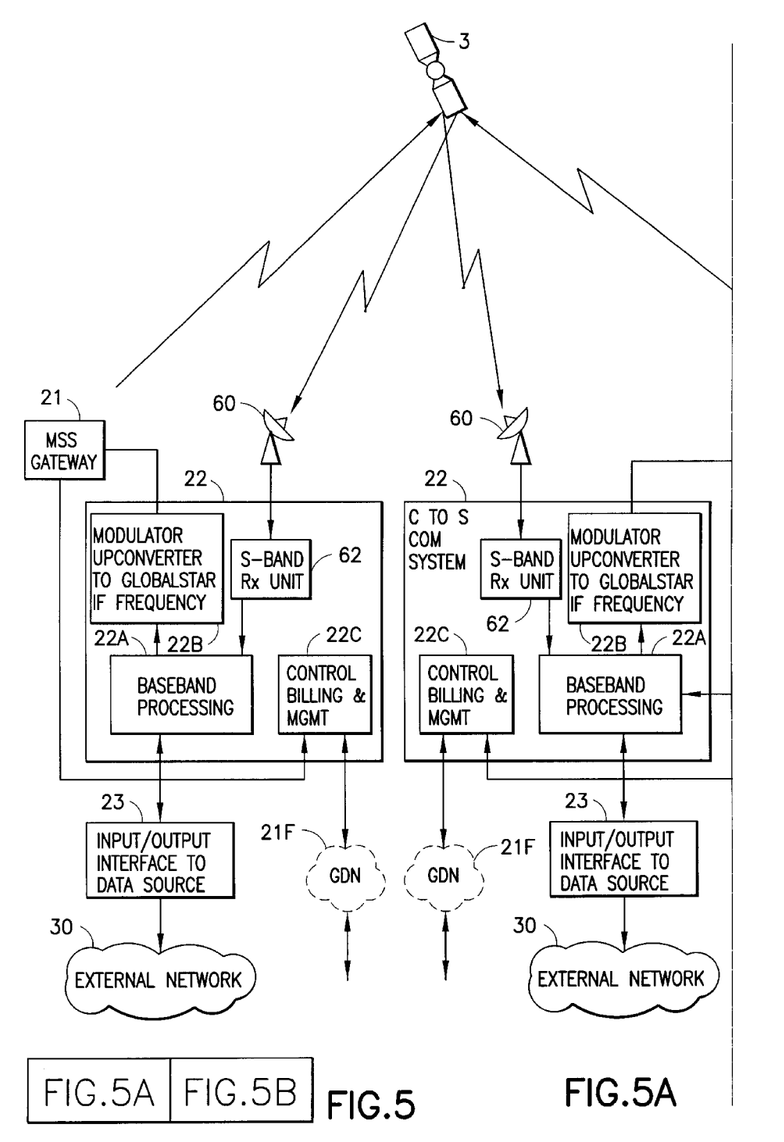
FIG. 5 depicts a gateway-to-gateway high speed data communications link in accordance with an aspect of these teachings.
Figure 5B:
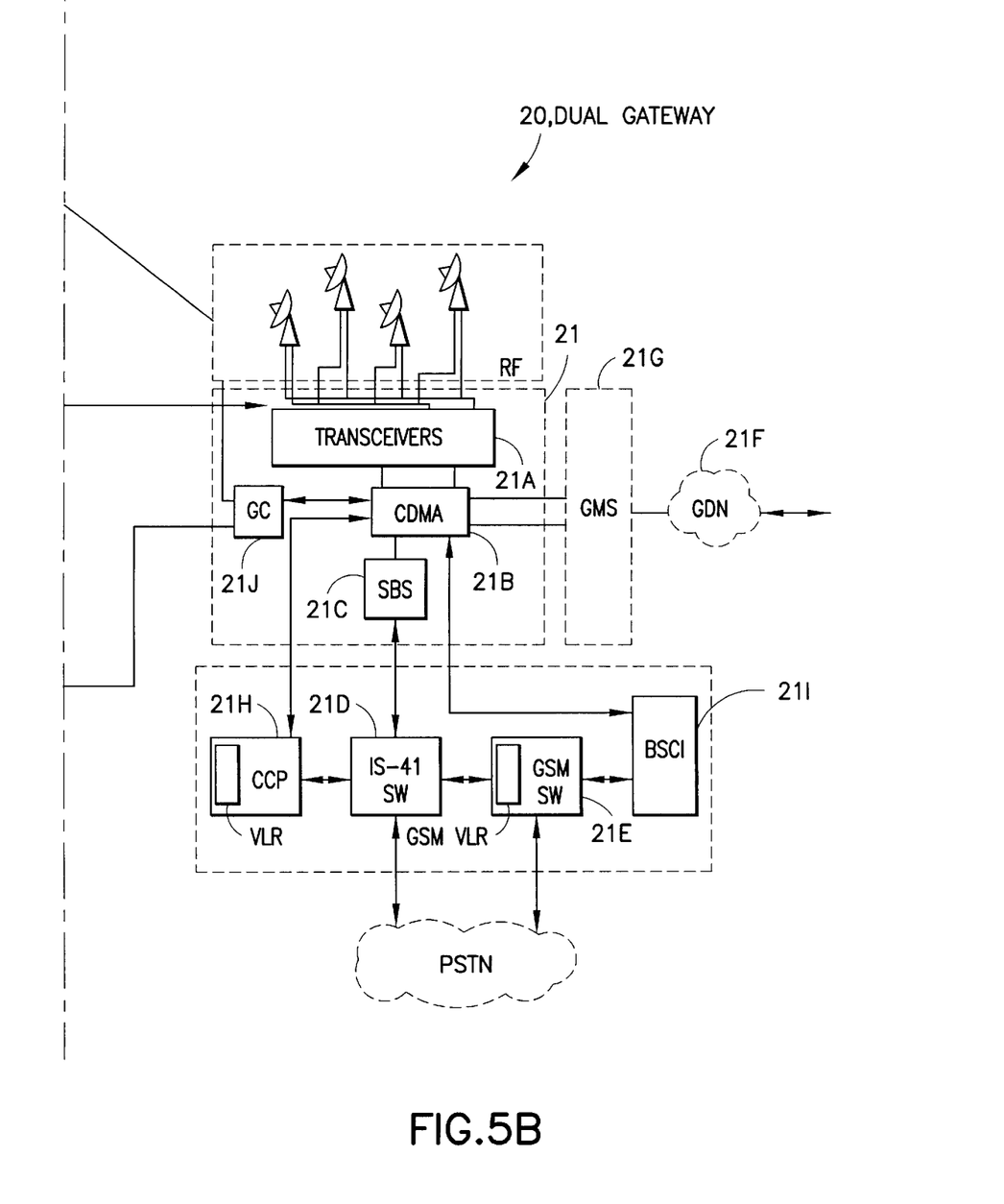

In addition to the above embodiments, and referring to FIG. 5, in another embodiment the High Speed forward link configuration is enhanced by adding an S-band antenna 60 at each Gateway 20. The addition of S-band antennas 60 and an S-band receiver 62 allows two way communications at high speed from one Gateway 20 to another, via one or more of the satellites 3.

While the invention has been particularly shown and described with respect to preferred embodiments thereof, it will be understood by those skilled in the art that changes in form and details may be made therein without departing from the scope and spirit of the invention.

What is claimed is:

1. A satellite-based communications system wherein communications between a user terminal and a gateway occur using an uplink band of frequencies between the user terminal to at least one satellite and in a downlink band of frequencies between the at least one satellite and the user terminal, comprising:
    a first transceiver at said user terminal for transmitting and receiving voice and data in said first and second bands of frequencies using a maximum data rate; and
    a second transceiver at said user terminal for transmitting and receiving data in said first and second bands of frequencies using a second data rate that exceeds said maximum data rate.

2. A satellite-based communications system as in claim 1, wherein said uplink band of frequencies comprises the L-band, and wherein said downlink band of frequencies comprises the S-band.

3. A satellite-based communications system as in claim 1, and further comprising a feederlink operating between said gateway and said at least one satellite, said feederlink operating in a third band of frequencies.

4. A satellite-based communications system as in claim 3, wherein said third band of frequencies comprises the C-band.

5. A satellite-based communications system as in claim 3, wherein said gateway comprises a first interface to voice and data signals and circuitry for transmitting and receiving the voice and data signals using said maximum data rate, and further comprising a second interface to data signals and circuitry for transmitting and receiving the data signals using said data rate that exceeds the maximum data rate.

6. A satellite-based communications system as in claim 5, wherein said first and second interfaces and circuitry, and said first and second transceivers, operate simultaneously.

7. A satellite-based communications system as in claim 1, wherein user terminal registration and control signals are transmitted and received using said first transceiver.

8. A satellite-based communications system as in claim 1, wherein said user terminal is comprised of at least one pointable antenna, and wherein information used for pointing said at least one antenna is received from said gateway using said first transceiver.

9. A satellite-based communications system as in claim 1, wherein said first transceiver comprises a portion of a Mobile Satellite Service (MSS) terminal that is detachable from said user terminal for being operated as a stand-alone unit for transmitting and receiving voice and data signals in said first and second bands of frequencies using said maximum data rate.

10. A satellite-based communications system as in claim 3, wherein said gateway comprises a PSTN interface for voice and data signals and circuitry for transmitting and receiving the voice and data signals using said maximum data rate, and further comprising an Internet interface for data signals and circuitry for transmitting and receiving the Internet data signals using said data rate that exceeds the maximum data rate.

11. A satellite-based communications system as in claim 1, wherein said gateway further comprises transceivers for transmitting and receiving data with another gateway, via at least one satellite, in at least one of said first and second bands of frequencies.

12. In a satellite-based communications system wherein communications between a user terminal and a gateway occur using an uplink band of frequencies between the user terminal to at least one satellite and in a downlink band of frequencies between the at least one satellite and the user terminal, a method comprising steps of:
    transmitting and receiving voice and data in said first and second bands of frequencies using a maximum data rate through a first transceiver in said user terminal; and
    transmitting and receiving data in said first and second bands of frequencies using a second data rate that exceeds said maximum data rate through a second transceiver in said user terminal.

13. A method as in claim 12, wherein said uplink band of frequencies comprises the L-band, and wherein said downlink band of frequencies comprises the S-band.

14. A method as in claim 12, and further comprising a step of operating a feederlink between said gateway and said at least one satellite, said feederlink operating in a third band of frequencies.

15. A method as in claim 14, wherein said third band of frequencies comprises the C-band.

16. A method as in claim 14, and further comprising steps of transmitting and receiving the voice and data signals using said maximum data rate with a first interface to voice and data signals and circuitry in said gateway; and transmitting and receiving the data signals using said data rate that exceeds the maximum data rate using a second interface to data signals and circuitry in said gateway.

17. A method as in claim 16, wherein said first and second interfaces and circuitry, and said first and second transceivers, operate simultaneously.

18. A method as in claim 12, and further comprising a step of transmitting and receiving user terminal registration and control signals using said first transceiver.

19. A method as in claim 12, wherein said user terminal is comprised of at least one pointable antenna, and further comprising a step of receiving information used for pointing said at least one antenna from said gateway using said first transceiver.

20. A method as in claim 12, wherein said first transceiver comprises a portion of a Mobile Satellite Service (MSS) terminal that is detachable from said user terminal for being operated as a stand-alone unit for transmitting and receiving voice and data signals in said first and second bands of frequencies using said maximum data rate.

21. A method as in claim 14, and further comprising steps of transmitting and receiving the voice and data signals using said maximum data rate through a PSTN interface to voice and data signals and circuitry in said gateway; and transmitting and receiving the data signals using said data rate that exceeds the maximum data rate using an Internet interface to data signals and circuitry in said gateway.

22. A method as in claim 12, and further comprising a step of transmitting and receiving data with another gateway, via at least one satellite, in at least one of said first and second bands of frequencies using gateway transceivers.

23. A method as in claim 12, wherein said first transceiver comprises a portion of a Mobile Satellite Service (MSS) terminal that is detachable from said user terminal for being operated as a stand-alone unit for transmitting and receiving voice and data signals in said first and second bands of frequencies using said maximum data rate, and wherein said second transceiver remains operational for transmitting and receiving data in said first and second bands of frequencies using said second data rate that exceeds said maximum data rate.

* * * * *